United States Patent Office 3,543,036
Patented Nov. 24, 1970

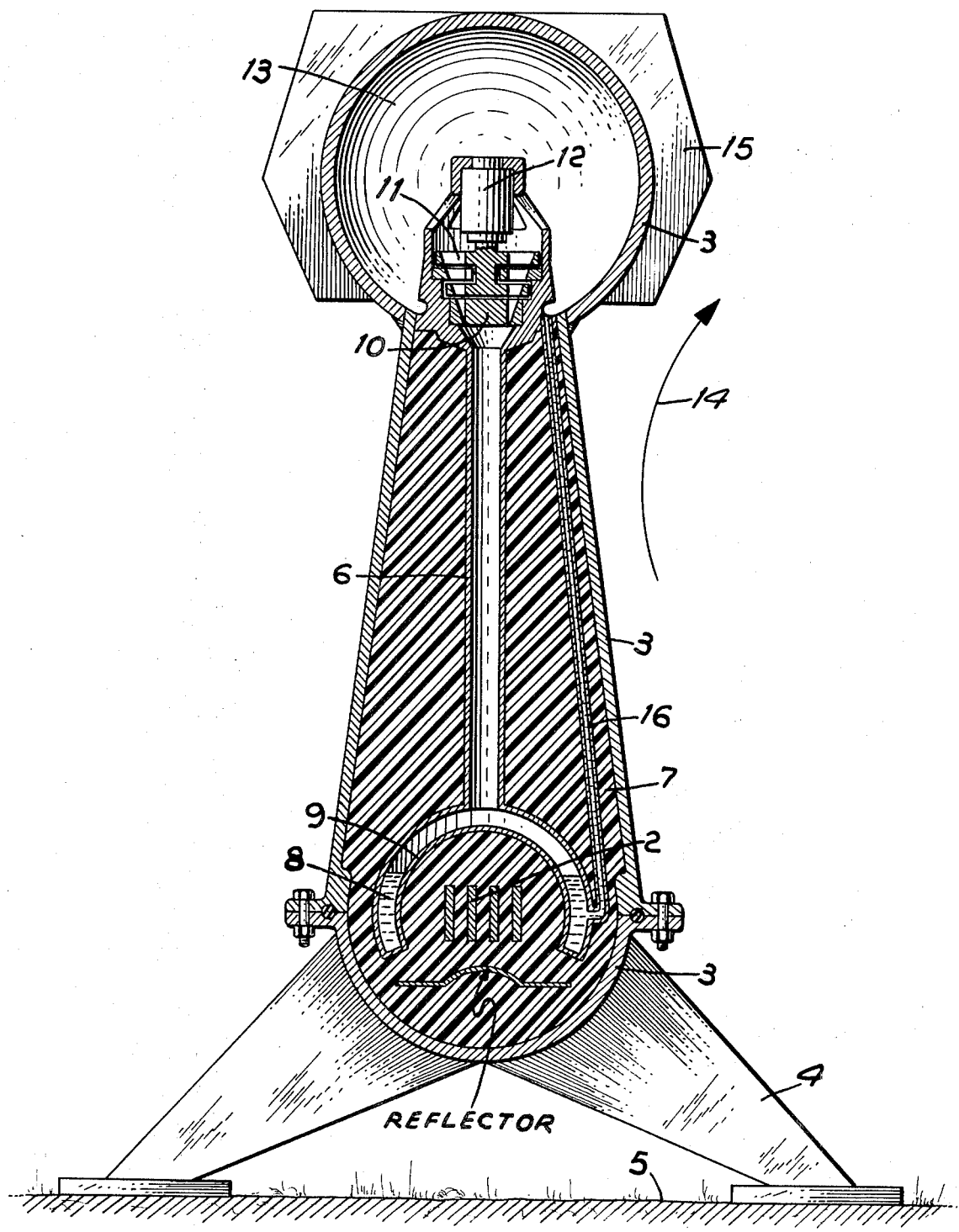

3,543,036
HYDROSPACE ENERGY CONVERTER
Charles P. Majkrzak, Nutley, N.J., assignor to International Telephone and Telegraph Corporation, a corporation of Delaware
Filed July 31, 1967, Ser. No. 657,218
Int. Cl. F01d 15/10
U.S. Cl. 290—2                                10 Claims

ABSTRACT OF THE DISCLOSURE

An arrangement is provided for converting energy of radiation from a radio-isotopic energy source into useful electrical energy using a mercury-vapor turbogenerator system, as the converter, to produce a submersible oceanographic power supply independent of the atmosphere for its operation.

CROSS-REFERENCE TO RELATED APPLICATIONS

This assignee's related applications include a "Power Supply System," Ser. No. 556,990, filed June 13, 1966; "An Oceanographic Data Collecting Buoy Arrangement," Ser. No. 619,978, filed Mar. 2, 1967; and "Lubricating Arrangement for Mercury-Vapor Turbogenerator," filed May 8, 1967, Ser. No. 636,836.

BACKGROUND OF THE INVENTION

In general this invention relates to a mercury-vapor turbogenerator which provides an electrical supply for remote marine locations, and, more particularly, to a device for converting the energy of radiation from a radio-isotopic energy source into useful electrical energy so as to produce a submersible oceanographic power supply independent of the atmosphere for its operation.

It is obvious that a power supply for remote marine locations requires some form of available energy to be converted into a useful electrical supply, in order to maintain the long-term unattended operation of detecting, data-collecting, signalling, and transmitting equipment. This power supply must have the characteristics of long uninterrupted life and a reasonably low fuel consumption.

In the applications referenced above, one of the features was the use of a liquid fuel, for example, liquid propane contained within tanks at its natural vapor pressure. Liquid propane when released through an orifice or a valve into near atmospheric pressure, returns to a gaseous state which is combustible without leaving a residue, and therefore permits stable operation for long periods without the need for cleaning or maintaining the boiler. The one drawback of this arrangement is that it must include an exhaust and intake mast, to exhaust the gases of combustion and to intake air to feed the burner.

Therefore it would seem desirable to provide, in addition to many of the features described in the aforementioned applications, the feature of not requiring an exhaust and intake mast, so that the unit would be capable of resting on the ocean floor.

SUMMARY OF THE INVENTION

It is therefore an object of this invention to provide a device for converting the energy of radiation from a radio-isotopic energy source into useful electrical energy.

Another object of this invention is the use of a mercury-vapor turbogenerator system, as the converter, for converting the energy of radiation from said radio-isotopic energy source to produce a submersible oceanographic power supply which is operationally independent of the atmosphere.

According to the broader aspects of this invention, an isotopic power source is used to heat liquid mercury contained within the boiler and change its form to a vapor which is expanded in a nozzle, the expanded vapor jet rotates turbine wheels which are coupled to the rotor of an alternator, the vapor is condensed, and the condensate is returned in a return tube to the boiler.

BRIEF DESCRIPTION OF THE DRAWING

The above-mentioned and other objects of this invention will become more apparent by reference to the sole figure, which shows the device for energy conversion according to this invention.

DESCRIPTION OF THE PREFEERED EMBODIMENT

Referring now to FIG. 1, a radio-isotopic power source 2 is enclosed in a hydrostatic casing 3, the lower spherical portion has attached to it a base and support mount 4 for resting on the harbor, lake or ocean floor 5. The hydrostatic casing has within it a riser 6 which is completely surrounded by thermal insulating material 7. The hydrostatic casing has also within it a boiler 9 which is completely surrounded by thermal insulating material 7. Liquid mercury 8 within the boiler section 9, is heated by the isotopic power source 2 and its vapor rises within the cylindrical riser section 6 to be expanded in nozzle 10. The expansion of the mercury vapor within nozzle 10 into a high-velocity jet causes rotation of turbine wheels 11. The wheels are directly coupled to the permanent magnet rotor of alternator 12 which is located in the upper spherical portion of the hydrostatic casing.

The mercury-vapor leaving turbine wheels 11 is condensed in condenser 13 by the free convection of external sea water, indicated generally by arrow 14. Cooling fins 15 are attached to the upper spherical portion of hydrostatic casing 3 so as to increase the effective cooling area and increase the cooling efficiency. The mercury condensate is then returned by gravity in return tube 16 to boiler 9. This arrangement provides a completely enclosed power supply system.

It should be noted that the lubricating arrangement which was included in the aforementioned patent application, Ser. No. 636,836, could be adapted for use in this system, providing continual lubrication of the alternator in keeping with the isotopic power source life.

A feature of this arrangement is that the boiler derives heat from the spontaneous decay of the radioactive material which provides a long-lived reliable source of energy. The three leading candidate isotopic power sources are cobalt, cerium and strontium. Cobalt (Co–60) requires 5.3 years to reach half of the initial output power, cerium (Ce–144) requires .78 year, and strontium (Sr–90) requires 28 years to reach half of the output power. The output of the radiating radio-isotope heat source does not require operator control, since it is inherently self-regulating, and will release energy steadily and effectively over the lifetime of the fuel. There are available isotope power sources which are designed as a unit, their adaptation to my power principle outlined in FIG. 1 is sufficiently within the state of the art so as to facilitate the building of an efficient and reliable oceanographic power supply. By using the heat energy of radiation produced by a radio-isotopic energy source, higher efficiencies are possible. The efficiencies being on the order of 15% as compared with other systems, for example, direct thermionic conversion or the use of working substances other than mercury, which are in the neighborhood of 5%.

The disclosed device will convert the energy of radiation from a radio-isotopic energy source into useful electrical energy using the mercury-vapor turbogenerator system as the converter and the end result will be a submersible oceanographic power supply which is independent of the atmosphere for its operation.

While I have described above the principles of my invention in connection with specific apparatus, it is to be clearly understood that this description is made only by way of example and not as a limitation to the scope of my invention, as set forth in the objects thereof and in the accompanying claims.

I claim:
1. A hydrospace energy converter comprising:
 a hydrostatic casing;
 a base attached to said casing;
 a radio-isotopic energy source encased within the lower portion of said hydrostatic casing;
 a boiler for converting liquid mercury to an operating vapor, said boiler being mounted within said hydrostatic casing and adjacent said power source;
 a riser attached to said boiler for transporting said vapor;
 insulation means surrounding said riser and boiler within said hydrostatic casing;
 a nozzle mounted within the upper portion of said hydrostatic casing adjacent said riser, such that the mercury-vapor is expanded in said nozzle;
 turbine wheels connected and mounted adjacent said nozzle such that the expanded mercury-vapor rotates said turbine wheels and means connected to said turbine wheels produce the electrical energy; and
 the upper portion of said hydrostatic casing serves as a condenser, wherein the mercury-vapor leaving said turbine wheels is cooled by the free circulating external sea water, and the mercury-vapor condensate is returned in a return tube connecting the upper portion of said casing to the lower portion and boiler, whereby, the mercury operating fluid is contained within a closed system.

2. A converter according to claim 1, further including cooling fins adapted to the upper portion of said hydrostatic casing, said cooling fins to increase the efficiency of the condenser.

3. A converter according to claim 2, wherein said means for producing electrical energy is an alternator having a permanent magnet rotor.

4. A converter according to claim 3, wherein said radio-isotopic power source is a cobalt, cerium, or strontium source.

5. A converter according to claim 4, wherein said lower hydrostatic casing is spherically shaped and connected by a cylindrical riser to said upper portion, and said upper hydrostatic casing portion being of spherical shape and containing said nozzle, wheels, and alternator.

6. A hydrospace energy converter comprising:
 a hydrostatic casing;
 a base attached to the lower portion of said casing and adapted for mounting on the ocean floor;
 a radio-isotopic energy source encased within the lower portion of said hydrostatic casing;
 a boiler mounted within said hydrostatic casing and adjacent said power source, said boiler being adapted to convert liquid mercury to an operating vapor;
 a cylindrical riser mounted atop said boiler, said riser being used to transport said operating vapor;
 insulation means surrounding said riser and boiler within said hydrostatic casing;
 a nozzle mounted atop said riser within the upper portion of said hydrostatic casing, such that the mercury operating vapor is expanded by said nozzle;
 turbine wheels mounted adjacent said nozzle so that the expanded mercury-vapor rotates said turbine wheels;
 means connected to said turbine wheels for production of electrical energy;
 said upper portion additionally acting as the condenser in which the mercury-vapor leaving said turbine wheels is cooled due to the free circulating external sea water surrounding said casing; and
 a return tube connecting the upper portion of said casing to the boiler, whereby, the mercury-vapor condensate is returned to the boiler to maintain the mercury operating fluid within a closed system.

7. A converter according to claim 6, further including cooling fins attached to the upper portion of said casing, said cooling fins to facilitate the transfer of heat from the condenser.

8. A converter according to claim 7, wherein said means for producing electrical energy is an alternator having a permanent magnet rotor.

9. A converter according to claim 8, wherein said radio-isotopic power source is a cobalt, cerium, or strontium source.

10. A converter according to claim 9 wherein said lower portion is of spherical shape, and said upper portion is also of spherical shape and connected to said lower portion by means of said cylinder riser.

References Cited
UNITED STATES PATENTS

| | | | |
|---|---|---|---|
| 2,765,414 | 10/1956 | Gendler et al. | 290—2 |
| 3,272,658 | 9/1966 | Rush | 290—2 XR |
| 3,349,247 | 10/1967 | Birkestrand | 60—108 XR |

ORIS L. RADER, Primary Examiner

G. SIMMONS, Assistant Examiner

U.S. Cl. X.R.

60—36, 108; 176—39; 290—52